H. A. HATFIELD.
ENDLESS TRACK.
APPLICATION FILED JUNE 13, 1918.

1,296,512.

Patented Mar. 4, 1919.

UNITED STATES PATENT OFFICE.

HUBERT AVERY HATFIELD, OF LONDON, ENGLAND, ASSIGNOR TO H. A. H. TRACTORS LIMITED, OF BIRMINGHAM, ENGLAND.

ENDLESS TRACK.

1,296,512.   Specification of Letters Patent.   Patented Mar. 4, 1919.

Application filed June 13, 1918. Serial No. 239,838.

*To all whom it may concern:*

Be it known that I, HUBERT AVERY HATFIELD, a subject of the King of Great Britain, at present serving with His Majesty's forces in France, and resident of London, England, have invented certain new and useful Improvements in Endless Tracks, of which the following is a specification.

This invention refers to improvements appertaining to motor-driven vehicles which are wholly or mainly supported upon endless self-laying tracks through the medium of which said vehicles receive motion of translation. Such endless tracks consist of a number of links pivoted together, each link being formed with a sole or bearing surface to contact with the ground, the said sole having corrugations or other suitable formations to grip the ground, and each track is carried by a main rear wheel through which it is driven and by a main forward wheel, while the intermediate length of the track between the two main wheels is supported by carrying wheels, and usually one such track is located upon each side of the chassis of the vehicle, which chassis is carried wholly or in great part by being connected to the frameworks which carry the structure of the tracks.

Now owing to their lower pressure per unit of area such motor vehicles carried upon endless self-laying tracks can travel over soft ground which is inaccessible to the wheel type, but this advantage is offset to some extent by the destructive effect which such tracks have upon made road surfaces, and the object of the present invention is to obviate this disadvantage by providing devices complete in themselves independently of the track, and each carrying a tread of comparatively soft material such as wood, or of resilient material such as india rubber, which devices can be readily fixed to the treads of such endless tracks when it is desired that the vehicle should travel over made road surfaces, and which can be removed therefrom when the vehicle is to travel over soft land upon unshod treads.

The invention will be described with reference to the accompanying drawings as applied to the sole of an endless track link, which latter is constructed in the manner described in the specification of my patent application Serial No. 239,837 of even date herewith.

Figure 1:
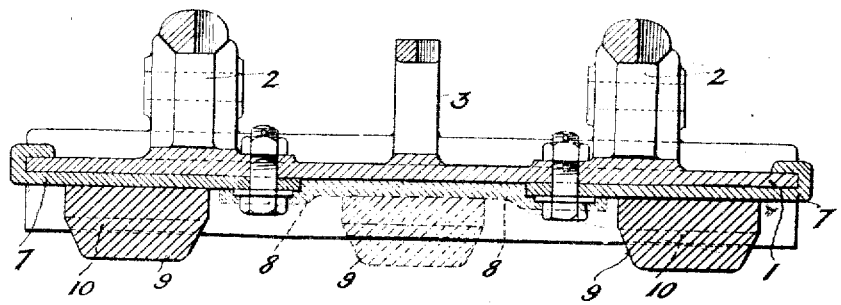
Figure 2:
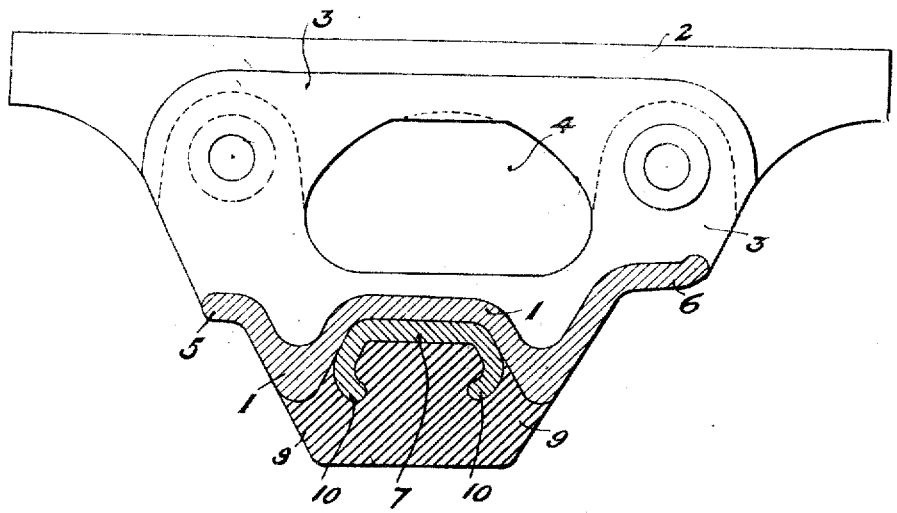
Figure 2:

In the accompanying drawing Figure 1 is a transverse section through one of the links of an endless track, and Fig. 2 is a longitudinal section taken centrally through the track link shown at Fig. 1, these views showing treads applied to the soles of the track link according to my invention.

The link illustrated has a sole 1 which is substantially rectangular in plan view, it being provided on its inner surface (the upper surface as shown at Fig. 1) and near each side with an upstanding longitudinally extending web 2, and centrally between these webs 2 there is a central upstanding rib 3, the webs 2, and the rib 3 each being formed with an aperture 4, Fig. 2 in order to permit of the lateral escape of dust or road refuse. The track is composed of a number of links such as Fig. 2, connected one to the other by pivot pins (not shown in the drawing) passing through the webs 2 and through the rib 3, so that each pivot pin has a three-point support, and it is upon these pivot pins that the track is engaged by the driving gear.

The front and rear edges 5, 6 of the link are at different levels so that the rear edge 6 of the sole of one link overlaps the front edge of the sole of the next link, and the central part of the sole extending transversely of the link is elevated above the normal bearing surfaces of the front and rear parts of the link, so that a groove extends transversely across the under face of the sole of each link and assists in gripping the surface over which the vehicle is traveling.

In the drawing, according to the present invention, the comparatively soft treads are made detachable so that they can be applied, without calling for special skill, to the soles of the links preparatory to traveling on ordinary made roads and can, if found necessary, be removed from the links before the vehicle is used for traction effort on rough land.

To this end for each link, two retainer plates 7 are provided, each formed at its outer side with a hook to take over the side edge of the track link, and the retainer plates 7 pass within the groove or corrugation formed on the under surface of the sole 1, and the inner end of each retainer plate 7 is then fixed to the sole of the link by a bolt passing through the plates 7 and the sole 1 as shown.

Where it is desired that a tread should also be fitted centrally of the link, I provide another retainer plate 8 which can conveniently fit exteriorly beneath the inner ends of the retainer plates 7 and be secured to the track link by the same bolts which secure the plates 7.

The treads are represented at 9 and may be composed of any suitable material which is relatively soft as compared with the metal from which the track links are constructed, and for example the treads may be of wood or vulcanized fiber and to secure the tread to the retainer plate the latter plate has formed upon its front and rear edges, arms 10 extending inwardly toward each other so as to form a retaining groove into which the tread is inserted. Where the tread is composed of india rubber, which is as illustrated, the india rubber block may be vulcanized in position on to and within the claws of the retainer plate.

I am aware that it has been proposed to fit the treads of driving wheels of traction engines with bars of metal extending transversely of the tread, each bar having a hooked portion to embrace the edge of the tire of the wheel, and a bolt passing through the opposite end of the bar and through the tire to hold the bar to the said tire, said bar having formed with it an outwardly projecting rib intended to enter the yielding surface of the ground and prevent the driving wheel from slipping, and I am also aware that grouters have been fitted to the rims of traction wheels, extending beyond the rims and in an angular direction. My invention however consists in the combinations and devices as hereinafter specifically claimed.

What I claim as my invention and desire to secure by Letters Patent is:—

1. In combination with a ground engaging trough of a track link for endless tracks, a cushion device for securement in said trough comprising a channel member having inwardly projecting edges, a cushion of comparatively soft material secured between the edges of said channel member and means for removably securing the cushion device in said trough.

2. In combination with a ground engaging trough of a track link for endless tracks, a cushion device for securement in said trough comprising a channel member having inwardly projecting edges, a cushion of comparatively soft material secured between the edges of said channel member, a hook on one end of said channel member to engage one edge of said track link and a bolt to pass through the opposite end of said channel member and said link to detachably secure said cushion device to said link.

3. In endless tracks for motor-driven vehicles comprising metal links pivoted together and each having a sole to contact with the ground substantially as specified; the combination with said track, each link having a groove on its sole extending transversely of the length of the track; of two retainer plates each located in said groove of said link with one face in contact with said link each retainer plate extending from the outer edge and terminating before reaching the center of said track link, a hook on the outer end of each retainer plate said hooks respectively receiving and engaging with the outer edges of said track link, a central retainer plate located in said groove of said link in contact with the sole thereof and having its outer ends overlapping the inner ends of the aforesaid side retainer plates, bolts to pass through the overlapping ends of said central retainer plate through the inner ends of said side retainer plates and through said track link to secure said retainer plates to the sole of said track link, treads of comparatively soft material, and means for fixing said treads to the outer faces of said side retainer plates and to the outer face of said central retainer plate substantially as set forth.

In witness whereof I have hereunto set my hand in the presence of two witnesses.

HUBERT AVERY HATFIELD.

Witnesses:
 NORMAN GRENVILLE NOTLEY,
 ROBERT PARKER LYLE.